3,251,818
ISOCYANURATE COMPOUNDS AND
PREPARATIVE PROCESSES
Eric C. Juenge and William C. Francis, Overland Park, and Donald L. Burdick, Mission, Kans., assignors, by mesne assignments, to Gulf Oil Corporation, Pittsburgh, Pa., a corporation of Pennsylvania
No Drawing. Filed Apr. 24, 1961, Ser. No. 104,787
9 Claims. (Cl. 260—88.3)

This invention relates to vinyl tri-substituted isocyanurate compounds and processes for their preparation. More particularly it relates to 1,3,5-trisubstituted s-triazine-2,4,6(1H,3H,5H)-triones of the following structural formula:

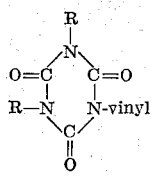

wherein the R groups are selected from the group consisting of alkyl, vinyl, and phenyl radicals. Although when R is alkyl it is preferred for most uses that alkyl be a lower alkyl radical, for example, methyl, ethyl, propyl, butyl, octyl, and the like, alkyl can vary considerably in chain length. For example, the alkyl radical can have up to about twenty-two carbon atoms. The alkyl radical can be a straight- or branched-chain radical and can also be cyclic such as cyclopentyl, cyclohexyl, or cycloheptyl. When R is phenyl, for most purposes the unsubstituted phenyl radical is preferred because of economic and other considerations. However, it is to be understood that when R is phenyl, the radical can have certain simple substituents which do not interfere with the reactions by which the compounds of this invention are prepared. For example, the phenyl radical can have substituents illustrated by the following radicals: halo substituents such as chloro, lower alkyl substituents such as methyl, lower alkoxy such as methoxy, lower acyloxy such as acetoxy, nitro, and the like radicals. Such substituents as hydroxy and amino, e.g., should be avoided because of their interference with the reactions by which the isocyanurate rings are formed. Likewise, it is obvious that alkyl can have simple, non-interfering substituents or groups, including carbon to carbon unsaturations.

The compounds of this invention are usually relatively viscous liquids at room temperatures or low melting solids. For example, trivinyl isocyanurate is a solid at room temperatures but has the low melting temperature of about 32° to 34° C. It is seen that these compounds are useful monomers in the preparation of polymers in view of the presence of vinyl substituents. The polymers formed generally are relatively stable, inert, and highly linear polymers, as when both R substituents are represented by, for example, simple alkyl substituents such as ethyl or butyl. However, when one of the R substituents is represented by an unsaturated radical such as an additional vinyl radical, relatively stable and inert thermoset polymers are readily provided, i.e., polymers having a cross-linked pattern permitted by the additional unsaturation of the R radical. The derived polymers in general are quite stable, for example, stable to strongly basic conditions, heat, and the like.

In another aspect of this invention, processes are provided by which vinyl tri-substituted isocyanurate compound, including those above described, can be provided. The processes of providing the vinyl tri-substitued iso-cyanurates comprise the reaction of vinyl isocyanate and a second organic isocyanate which is capable of trimerizing with vinyl isocyanate to form a vinyl tri-substituted isocyanurate, in the presence of a catalyzing amount of a cyclization base catalyst. No second isocyanate will of course be employed in this process if the homo-substituted vinyl isocyanurate compound is desired. However, if one or two of the N-substituents are to be another organic radical, the required organic isocyanate having the organic substituent desired as a R-group as above defined in the finally provided isocyanurate compound, will be employed. The organic isocyanates may have substituents such as alkyl and phenyl substituents as above described. The organic isocyanate may additionally be an organic isocyanate in which the radical is a heterocyclic mononuclear aryl radical such as thenyl, thiazinyl, 2- or 3-pyridyl, morphilinyl, or piperidyl radical.

The reactions can customarily be carried on at room temperatures or lower temperatures such as in an ice bath, depending upon the particular isocyanates employed. However, at times it will be preferred after the additions to elevate the reaction temperature, e.g., to reflux temperatures. As the cyclization catalyst, customarily the base triethyl phosphine has been found generally useful. In some instances, triethyl amine has been employed with satisfactory results. Other catalysts will be suggested to those skilled in the art in view of the teaching herein provided.

The quantity of the vinyl isocyanate and the second organic isocyanate necessary to yield the mixed tri-substituted isocyanurate desired will depend upon the relative reactivities of the isocyanates. Thus, at times an excess of the quantity supplying the theoretical amount of vinyl isocyanate will be employed, and, at other times, an excess instead of the second organic isocyanate will be utilized. For example, it has been found in the formation of butyldivinyl isocyanurate, the reaction favors formation of the homo-substituted isocyanurate, trivinyl isocyanurate, rather than the isocyanurate desired having both butyl and vinyl substituents. In such instances, the skill of the art will employ excess amounts of the organic isocyanate to promote synthesis of the desired hetero-substituted isocyanurate. On the other hand, such as in the preparation of hetero-substituted phenylvinyl isocyanurates, a preference is shown by phenyl isocyanate to form triphenyl isocyanurate rather than the desired hetero-substituted isocyanurates, e.g., phenyldivinyl isocyanurate. Therefore, in contrast, in such instances it is required to increase the relative amount of the second organic isocyanate reactant over the theoretical requirement. In preparations of other hetero-substituted isocyanurates, about the theoretical ratios of vinyl isocyanate and the organic isocyanate can be effectively employed.

The reactions are carried on preferably with stirring for a time sufficient to provide reasonably efficient reactions and yields, and in inert atmospheres such as nitrogen. Stabilizers such as hydroquinone and dinitrobenzene are added to the reaction mixtures as desired or required. Ordinarily, use of reaction solvents is not a requirement of the process. However, at times the use of a quantity of an inert reaction solvent will possibly serve a useful purpose, such as better reaction control, and the like.

The desired reaction product is isolated from the reaction mixtures following conventional procedures in view of the fact that the products are customarily liquids at room temperatures or low melting solids, by following conventional distillation, chromatography, extraction, precipitation procedures, and the like isolation procedures.

The following examples are in further illustration of the compounds and processes of this invention but are not in limitation thereof except as defined by the appended claims.

*Example 1.—Preparation of 1,3,5-trivinyl-s-triazine-2,4,6-(1H,3H,5H)-trione (trivinyl isocyanurate)*

To freshly distilled vinyl isocyanate (10.35 g., 0.15 mole) is added dropwise 1.49 g. of triethyl phosphine with stirring and maintaining the mixture cool in an ice bath. The reaction mixture is permitted to warm slowly to room temperature with stirring and is stirred for an additional two hours at room temperature, after which a 0.1 g. amount of hydroquinone and 0.1 g. of dinitrobenzene are added. The reaction is carried on in a nitrogen atmosphere. From the reaction mixture, the triethyl phosphine is removed from the reaction mixture by distillation at room temperature under reduced pressure. The residue consisting of an oily liquid and containing the desired trivinyl isocyanurate is purified by distillation, to provide a light yellow liquid fraction distilling at 127° C. and a pressure of 0.28 mm. of mercury. This fraction consisting of trivinyl isocyanurate was further purified by redistillation during which a fraction boiling at 114–6° C. at a pressure of 0.17 mm. of mercury is collected. From this fraction, the desired product of trivinyl isocyanurate separates as a white, crystalline solid melting at 32 to 34° C.

Calculated for $C_9H_9N_3O_3$ (mol. wt. 207): C, 52.17; H, 4.38; iodine number, 368. Found: C, 52.22; H, 4.32; iodine number, 375; mol wt., 197.

Triethyl amine can be employed as the catalyst rather than triethyl phosphine in the above preparation of trivinyl isocyanurate with satisfactory results.

Trivinyl isocyanurate is polymerized with benzoyl peroxide employing conventional conditions to provide clear, infusible polymers.

*Example 2.—Preparation of 1-butyl-3,5-divinyl-s-triazine-2,4,6(1H,3H,5H)-trione (butyl-divinyl isocyanurate) and 1,3-dibutyl-5-vinyl-s-triazine-2,4,6(1H,3H,5H)-trione (dibutylvinyl isocyanurate)*

A quantity of 1.12 g. (0.095 mole) of triethyl phosphine is added to a mixture of 5.87 g. (0.085 mole) of vinyl isocyanate and 17.0 g. (0.17 mole) of butyl isocyanate with stirring and maintaining the mixture during the addition cool in an ice bath. After the initial exothermic reaction subsides, the reaction mixture is refluxed for a period of five hours. The reaction is carried on in a nitrogen atmosphere. From the reaction mixture, the volatile substances are removed by evaporation in vacuo at room temperature for a period of five hours. The residual reaction consisting of the desired isocyanurate products is distilled providing 17.0 g. of distillate fractions boiling from 120° C., 0.4 mm. of mercury pressure, to 155° C., 0.3 mm. of mercury pressure. This crude distillate containing the desired butyldivinyl isocyanurate and dibutylvinyl isocyanurate is further purified by gas liquid chromatography through silicone grease on firebrick support. The following chromatography procedure is employed in the separation: A two-meter chromatographic column having a diameter of 1.25 inches is used. The column temperature is 175° C. and a gas flow of 1100 ml. per minute of helium is used in the column development. Effluent fractions are collected at salt-ice bath temperatures.

The first eluate peak collected from the column consists of trivinyl isocyanurate and represents about sixteeen percent by weight of the distillate applied to the column.

The second eluate peak collected consists of butyldivinyl isocyanurate, representing about forty-eight percent by weight of the distillate applied to the column.

*Analysis.*—Calculated for $C_{11}H_{15}N_3O_3$: C, 55.68; H, 6.37, iodine number, 214. Found: C, 55.65; H, 6.47; iodine number, 204.

The third eluate peak collected consists of dibutylvinyl isocyanurate obtained in a yield of about eleven percent of the total distillate applied to the column.

*Analysis.*—Calculated for $C_{13}H_{21}N_3O_3$: C, 58.03; iodine number, 95. Found: C, 58.18; iodine number, 99.

*Example 3.—Preparation of 1,3-diphenyl-5-vinyl-s-triazine-2,4,6(1H,3H,5H)-trione (diphenylvinyl isocyanurate) and 1-phenyl-3,5-divinyl-s-triazine-2,4,6(1H,3H,5H)-trione (phenyldivinyl isocyanurate)*

A quantity of 1.49 g. of triethyl phosphine is added to a mixture of freshly distilled vinyl isocyanate (3.45 g., 0.05 mole) and phenyl isocyanate (11.91 g., 0.1 mole) with stirring and maintaining the reaction mixture at room temperature. A precipitate formed in the reaction mixture, which formation is followed by an exothermic reaction causing the dissolution of the solid precipitate. The liquid reaction mixture turns to a deep red color. The reaction is conducted in a nitrogen atmosphere. After about ten minutes, the reaction mixture solidifies. The solidified reaction mixture is taken up in a minimum volume of chloroform from which a precipitate of triphenyl isocyanurate appears on cooling to −60° C. The triphenyl isocyanurate product is removed by filtration providing a yield of 5.7 g.

The filtrate containing the desired diphenylvinyl isocyanurate is chromatographed in the following manner:

The chloroform extract is evaporated to dryness. The dried residue is taken up in a small volume of a 1:1 by volume chloroform-carbon tetrachloride mixture and is applied to a chromatographic column of alumina. The column is developed with the above chloroform-carbon tetrachloride mixture as eluting solvent providing a first effluent fraction which on evaporation yields about one gram of a white solid product. The solid shows on infrared analysis presence of vinyl, phenyl, carbonyl, and isocyanurate ring absorptions. After recrystallization from ether and drying, the phenyldivinyl isocyanurate crystalline product melted at 115–116° C.

*Elemental analysis.*—Calculated for $C_{13}H_{11}N_3O_3$: C, 60.70; H, 4.31; N, 16.34. Found: C, 60.76; H, 4.11; N, 16.62.

*Example 4.—Preparation of 1-ethyl-3,5-divinyl-s-triazine-2,4,6(1H,3H,5H)-trione (ethyldivinyl isocyanurate)*

To an admixture of freshly distilled vinyl isocyanate (6.91 g., 0.1 mole) and ethyl isocyanate (3.55 g., 0.05 mole) in 50 ml. of benzene (dried over sodium), 1.4 g. of triethyl phosphine is added with stirring maintaining the reaction mixture at room temperature. After the addition, the reaction mixture is permitted to stand overnight at room temperature after which it is refluxed for an additional five-hour period. The reaction is conducted in a nitrogen atmosphere. The benzene is removed from the reaction mixture along with the triethyl phosphine and unreacted isocyanates by evaporation in vacuo at room temperature. The residual product containing the ethyldivinyl isocyanurate product is distilled yielding a fraction at a temperature of 128°–129° C. and a pressure of 0.33–0.35 mm. consisting of a slightly yellow liquid product containing the desired ethyldivinyl isocyanurate as well as some trivinyl isocyanurate.

What is claimed is:

1. A vinyl tri-substituted isocyanurate selected from the group of the following formula:

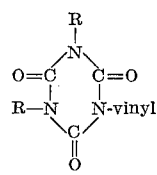

wherein the R groups are selected from the group consisting of alkyl, vinyl, and phenyl.

2. An isocyanurate in accordance with claim 1 wherein the R groups are alkyl.

3. 1,3,5-trivinyl-s-triazine-2,4,6(1H,3H,5H)-trione.

4. 1 - butyl - 3,5 - divinyl - s - triazine - 2,4,6(1H,3H,5H)-trione.

5. 1,3 - dibutyl - 5 - vinyl - s - triazine - 2,4,6(1H,3H,5H)-trione.

6. 1,3 - diphenyl - 5 - vinyl - s - triazine - 2,4,6(1H,3H,5H)-trione.

7. 1 - phenyl - 3,5 - divinyl - s - triazine - 2,4,6(1H,3H,5H)-trione.

8. 1 - ethyl - 3,5 - divinyl - s - triazine - 2,4,6(1H,3H,5H)-trione.

9. Clear, infusible polymer of 1,3,5-trivinyl-s-triazine-2,4,6(1H,3H,5H)-trione.

References Cited by the Examiner

UNITED STATES PATENTS

| | | | |
|---|---|---|---|
| 2,334,476 | 11/1943 | Coffmann | 260—453 |
| 2,580,468 | 1/1952 | Schaefer et al. | 260—248 X |
| 2,643,990 | 6/1953 | Ham | 260—248 |
| 2,860,139 | 11/1958 | Meis et al. | 260—248 |
| 2,965,614 | 12/1960 | Shashoua | 260—453 X |
| 2,977,360 | 3/1961 | Dixon | 260—248 |
| 2,977,371 | 3/1961 | Dixon | 260—248 X |
| 3,065,231 | 11/1962 | Frazier | 260—248 |

FOREIGN PATENTS 856,372   12/1960   Great Britain.

OTHER REFERENCES

Belgian Patent 576,022 (not yet available—abstracted in Derwent Belgian Patents Report, vol. 57, A, page C 9, Sept. 30, 1959.

Degering: "An Outline of Organic Chemistry," 6th Edition, page 362, Barnes and Noble, Inc., New York (1951).

Reinhardt et al.: Chemiches Berichte, vol. 90, pages 2643–5 (1957).

Shashoua: J. Am. Chem. Soc., vol. 81, page 3156 (1959).

Smolin et al.: "s-Triazine and Derivatives," pages 401, 404 and 411–412, Interscience Publishers, Inc., New York (1959).

White: The Journal of the Society of Dyers and Colourists, vol. 70, page 482 (1954).

WALTER A. MODANCE, *Primary Examiner.*

IRVING MARCUS, JOHN D. RANDOLPH, *Examiners.*